(No Model.)

H. R. INGLEDUE.
HARVESTER.

No. 363,746. 2 Sheets—Sheet 1. Patented May 24, 1887.

Witnesses.
Will R. Quohundro.
Irvine Miller.

Inventor:
Harvey R. Ingledue
By Coburn & Thacher
Atty's

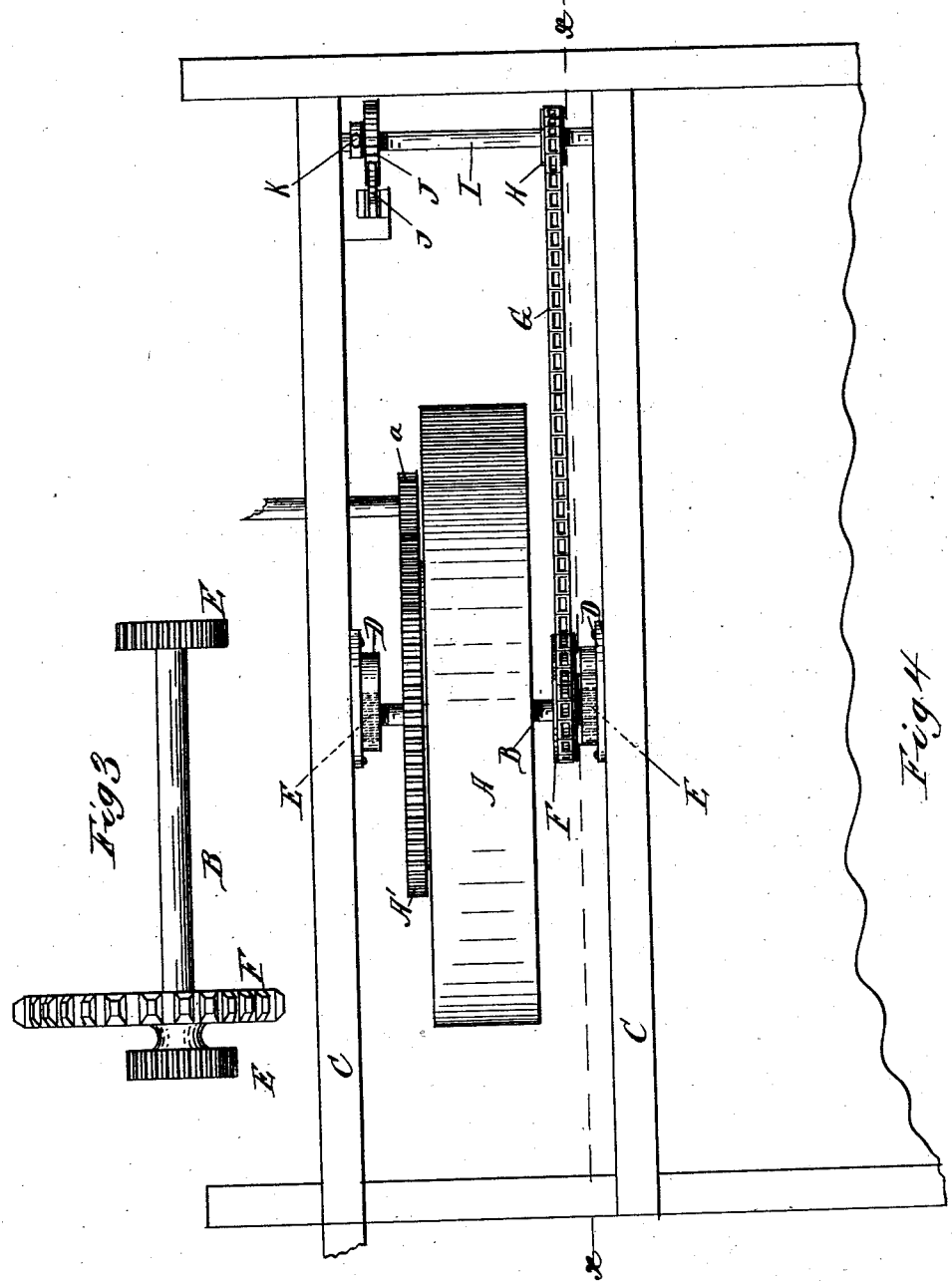

UNITED STATES PATENT OFFICE.

HARVEY R. INGLEDUE, OF PLANO, ILLINOIS, ASSIGNOR TO THE PLANO MANUFACTURING COMPANY, OF SAME PLACE.

HARVESTER.

SPECIFICATION forming part of Letters Patent No. 363,746, dated May 24, 1887.

Application filed August 26, 1886. Serial No. 211,945. (No model.)

*To all whom it may concern:*

Be it known that I, HARVEY R. INGLEDUE, a citizen of the United States, residing at Plano, in the county of Kendall and State of Illinois, have invented a certain new and useful Improvement in Harvesters, which is fully set forth in the following specification, reference being had to the accompanying drawings, in which—

Figure 1:
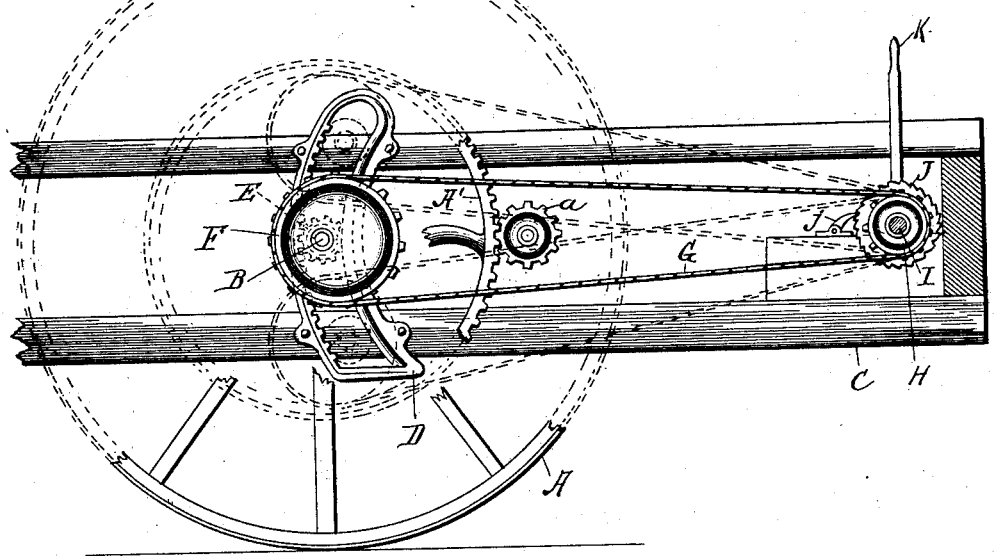
Figure 2:
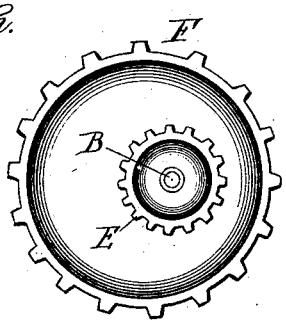

Figure 1 is a side elevation of a mechanism embodying the invention; Fig. 2, an end view of the axle, detached, with its pinion and sprocket wheel, but without the ground-wheel; Fig. 3, a rear elevation of the same; Fig. 4, a plan of the main frame, ground-wheel, and adjacent parts. Figs. 1 and 4 are on the same scale, but Figs. 2 and 3 are on a different and enlarged scale.

Like letters refer to like parts in all the figures of the drawings.

The invention relates to harvesters, and more particularly to mechanism for adjusting the main frame thereof by raising and lowering the same, its object being to provide means whereby the sprocket-chain which actuates the adjusting mechanism will be kept taut in all positions; and to this end it consists in certain novel features, which will now be described, and will then be particularly pointed out in the claims.

In the drawings, A represents the main or ground wheel of a harvester, mounted loosely on an axle, B; and C, the main or supporting frame, only so much of said frame being shown as is immediately adjacent to the main wheel A.

D represents a segmental rack, which is attached to the main frame C on each side the main wheel, and E represents a pinion secured on each end of the axle B and meshing with the racks D, as shown in Figs. 1 and 4. The axle B is also provided with a sprocket-wheel, F, secured thereon, a sprocket-chain, G, passing over this sprocket-wheel and over a second sprocket-wheel, H, preferably of smaller size, secured on a shaft, I, mounted in the main frame C, toward the rear thereof. The shaft I is provided with a ratchet-wheel, J, and locking-pawl $j$, as is usual in mechanism of this description, for the purpose of locking the said shaft and preventing its accidental rotation. The said shaft is also provided with a hand-lever, K, by means of which it can be rotated, said hand-lever being connected to it in any approved manner.

The main wheel A has attached to it, in the usual manner, a driving-gear, A', which meshes with the driving-pinion $a$, this latter being mounted, as usual, on a suitable shaft having its bearings in the main frame C.

It will be understood, of course, that the segmental rack D is formed on a curve or segment of a circle having the center of the driving-pinion $a$ for its center, the purpose of this construction being to retain the driving-pinion $a$ in gear with the driving-gear A' during the raising and lowering of the main frame. This raising and lowering action is obtained in a manner usual in devices of this description by the rotation of the shaft I by means of the hand-lever K, the said rotation causing the axle to revolve through the medium of the sprocket-wheels H and F and of the sprocket-chain G, connecting the two, thereby causing the pinions E to operate upon the racks D and impart to the said rack and the main frame, which is attached thereto, an upward or a downward motion, as the case may be. In consequence of the curvature of the rack D, which is desirable for the reason already pointed out, the main frame C and the various portions of the mechanism connected thereto are given, in addition to their vertical movement, a movement to the front or to the rear relatively to the main wheel and its axle, the movement of the frame being, in fact, in the arc of a circle having the center of the pinion $a$ for its center. The shaft I not being located at this center of movement, however, tends to approach toward or recede from the axle B, and as the sprocket-chain G is taut in the position shown in Fig. 1, this chain would, if the ordinary construction were adopted, become slack as soon as the parts were moved from that position. This difficulty is overcome, however, by mounting the sprocket-wheel F upon the axle B eccentrically to the said axle, so that as the axle revolves the eccentricity of the said sprocket-wheel will take up the slack of the sprocket-chain and keep the same taut in the various positions which the parts may assume, this effect being plainly indicated in dotted lines in Fig. 1 of the drawings.

By means of the construction which is described above, the main frame may be readily raised or lowered without causing the sprocket-chain to either bind or become slack, thus relieving it of all strain, and at the same time keeping it constantly in operative position.

The construction of the various portions of the mechanism above described, and which are common in apparatus of this general description, may obviously be varied within wide limits without departing from the principle of the invention, and the improvement is therefore not to be understood as limited strictly to the precise construction and arrangement of these devices hereinbefore described, and shown in the drawings.

Having thus described the invention, what I claim as new, and desire to secure by Letters Patent, is—

1. The main frame, in combination with the segmental racks attached thereto, the main axle provided with fixed pinions engaging with the racks, a sprocket-wheel fixed eccentrically on the axle, the sprocket-wheel on the main frame, and a sprocket-chain connecting the sprocket-wheels, substantially as and for the purposes set forth.

2. The combination, with the main frame C, provided with segmental racks D, sprocket-wheel I, mounted on the frame, and means for operating the same, of the main axle B, provided with fixed pinions E and eccentrically-fixed sprocket-wheel F, and a sprocket-chain G, connecting the two sprocket-wheels, substantially as and for the purposes set forth.

HARVEY R. INGLEDUE.

Witnesses:
GEORGE G. HUNT,
W. H. FRITTS.